(12) United States Patent
Fukushima et al.

(10) Patent No.: US 7,255,008 B2
(45) Date of Patent: Aug. 14, 2007

(54) VIBRATION-TESTING SYSTEM

(75) Inventors: Takehiro Fukushima, Osaka (JP); Keisuke Shimada, Osaka (JP); Shigehisa Tsutsumi, Osaka (JP)

(73) Assignee: IMV Corporation, Osaka (JP)

( * ) Notice: Subject to any disclaimer, the term of this patent is extended or adjusted under 35 U.S.C. 154(b) by 0 days.

(21) Appl. No.: 11/398,578

(22) Filed: Apr. 6, 2006

(65) Prior Publication Data
US 2006/0248955 A1    Nov. 9, 2006

(51) Int. Cl.
*G01M 7/06* (2006.01)
(52) U.S. Cl. ....................................................... 73/664
(58) Field of Classification Search ........... 73/663–668
See application file for complete search history.

(56) References Cited

U.S. PATENT DOCUMENTS

| | | | | |
|---|---|---|---|---|
| 4,498,343 A | * | 2/1985 | Kimball | 73/663 |
| 4,875,374 A | * | 10/1989 | Pinson | 73/663 |
| 4,947,067 A | * | 8/1990 | Habermann et al. | 310/51 |
| 5,042,306 A | * | 8/1991 | Cericola et al. | 73/667 |
| 6,257,067 B1 | * | 7/2001 | Ankrom et al. | 73/663 |
| 2003/0200811 A1 | * | 10/2003 | Woyski et al. | 73/663 |

FOREIGN PATENT DOCUMENTS

| | | |
|---|---|---|
| JP | 08-122199 | 5/1996 |
| JP | 2005091078 A * | 4/2005 |

* cited by examiner

*Primary Examiner*—Hezron Williams
*Assistant Examiner*—Rose M. Miller
(74) *Attorney, Agent, or Firm*—Edwards Angell Palmer & Dodge LLP

(57) ABSTRACT

Horizontal vibration shakers 21a and 21b are disposed opposite to each other on both sides of a vibration table 4, and either of the horizontal vibration shakers, e.g. 21a is arranged vertically movable so as to produce a positional difference (offset) with respect to a horizontal vibration axis 63 of the other horizontal vibration shaker 21b. When it is supposed that an accelerated velocity appears upwards on the left side of the vibration table 4, while another accelerated velocity appears downwards on the right side of the vibration table 4 as a result of generation of a rotational mode M, one of the horizontal vibration shakers, e.g. 21a, is elevated to produce the positional difference (offset) with respect to the horizontal vibration axis 63 of the other opposed horizontal vibration shaker 21b. In addition, vibration forces of the horizontal vibration shakers 21a and 21b are controlled at the same time to produce a moment towards the reverse direction, whereby the rotational mode M is suppressed so as to balance the right and left moments.

5 Claims, 20 Drawing Sheets

VIBRATION-TESTING SYSTEM

BACKGROUND OF THE INVENTION

1. Field of the Invention

The present invention relates to a vibration-testing system used in vibration test for a variety of structures and the like.

2. Description of the Related Art

FIG. 23 shows such conventional multiaxial type of a vibration-testing system. The vibration-testing system 81 is composed of a vibration shaker 83 of a hydrostatic bearing type wherein a vibration table 82 is disposed on the top in the substantially central portion of the vibration shaker, a hydraulic pump unit 84 for controlling a variety of hydraulic pressures in the vibration shaker 83, a cooling blower 85 for cooling the vibration shaker 83, and a power amplifier 86 for supplying an electric power to the vibration shaker 83, the hydraulic pump unit 84, and the cooling blower 85, respectively. In the conventional vibration-testing system 81, since it is so constructed that the vibration shaker 83, the hydraulic pump unit 84, the cooling blower 85, and the power amplifier 86 are disposed individually, the power amplifier 86 is connected to the vibration shaker 83, the hydraulic pump unit 84, and the cooling blower 85 through a power supply cable 87. On one hand, the hydraulic pump unit 84 is connected to the vibration shaker 83 through a hydraulic hose 88, while the cooling blower 85 is connected to the vibration shaker 83 through a duct hose 89.

The vibration shaker 83 includes, as is well-known, a horizontal vibration generation section composed of a pair of horizontal vibration shakers for generating vibration along X-direction in a horizontal plane, another horizontal vibration generation section composed of a pair of horizontal vibration shakers for generating vibration along Y-direction perpendicular to the X-direction, and a further vertical vibration generation section for generating vibration along Z-direction in a vertical direction. Furthermore, the vibration shaker 83 is arranged in such that vibration in three axes along the X-, Y-, and Z-directions may be applied to a material to be tested placed on the vibration table 82, whereby vibration test is carried out.

In the case when the horizontal vibration generation section in the above-described X-direction or the horizontal vibration generation sections in the X- and Y-directions are driven to vibrate the vibration table 82, there is a case where a rotational mode M appears (see FIG. 23) in its vibration characteristic. When the rotational mode M appears, there is such a problem that an accelerated velocity due to the rotational mode M appears in the Y- or Z-direction, whereby a correct vibration test cannot be achieved.

SUMMARY OF THE INVENTION

The present invention has been made to eliminate the above-described conventional disadvantage, and an object of the invention is to provide a vibration-testing system by which the rotational mode can be suppressed to implement a correct vibration test, even if the rotational mode appears.

According to the present invention, a vibration-testing system is characterized by comprising a vibration table on which a material to be tested is placed to implement a vibration test; horizontal vibration shakers disposed on both sides of the vibration table in opposite to each other and for vibrating the vibration table; a means for moving vertically at least either of the horizontal vibration shakers; a sensor for detecting a rotational mode appeared in the vibration table; and a control means for moving vertically the horizontal vibration shakers by the means based on a detection signal of the rotational mode derived from the sensor, whereby a positional difference is produced on a horizontal vibration axes in the opposed horizontal vibration shakers, and in addition, vibration forces of the horizontal vibration shakers are controlled to suppress the rotational mode.

According to the vibration-testing system, when a rotational mode appears, a positional difference (offset) is produced by the control means based on an output from the sensor with respect to a horizontal vibration axis in either of the horizontal vibration shakers, and further vibration forces of both the horizontal vibration shakers are controlled, whereby the rotational mode can be suppressed, resulting in realization of a correct vibration test.

DESCRIPTION OF THE PREFERRED EMBODIMENT

A preferred embodiment of the vibration-testing system according to the present invention will be described in detail hereinafter by referring to the accompanying drawings.

Figure 1:
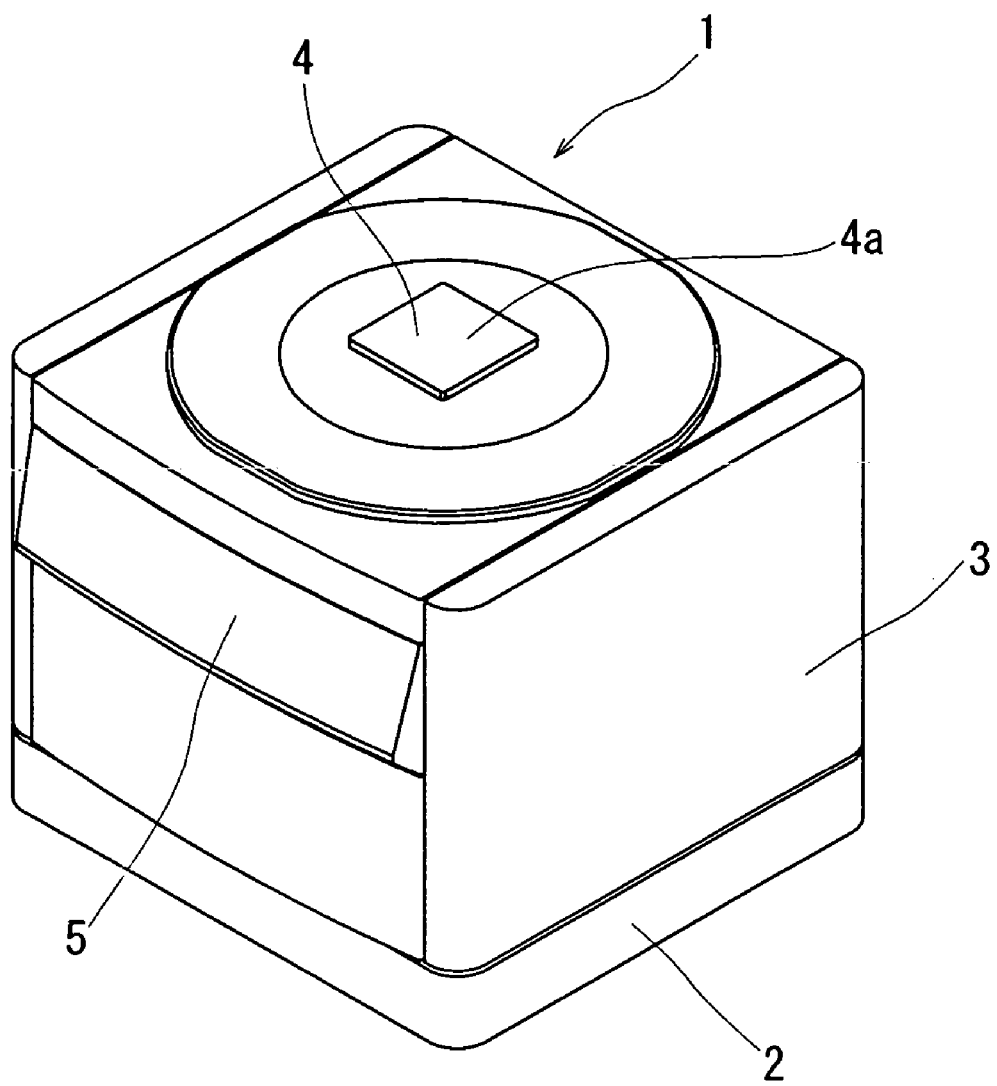
FIG. 1 is an isometric drawing showing an appearance of a vibration-testing system according to an embodiment of the present invention.
Figure 2:
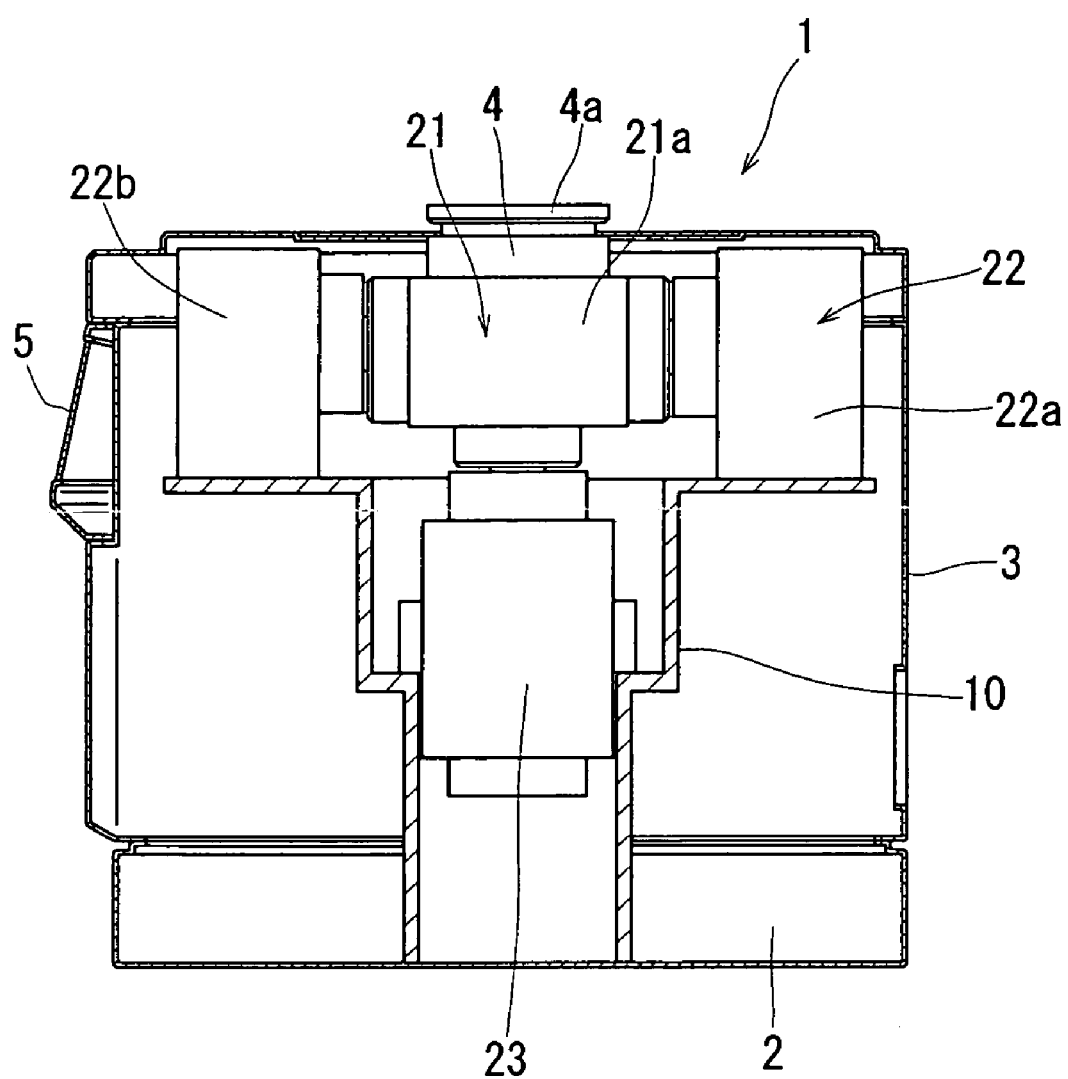
FIG. 2 is a sectional view showing the vibration-testing system according to the embodiment of the present invention wherein an internal mechanism thereof is omitted.

FIG. 1 is an isometric drawing showing an appearance of the vibration-testing system 1 of a hydrostatic bearing type of the present invention;

FIG. 2 is a sectional view showing the vibration-testing system 1 of the present invention wherein an internal mechanism thereof is omitted. The vibration-testing system 1 is an electrodynamic vibration-testing system which includes a base 2 constituting an outer shell, and a casing 3 containing integrally respective components therein. A table 4a of a vibration table 4 on which a material to be tested is placed to implement a vibration test is located on the top of the vibration-testing system 1, and an operation panel 5 for setting respective vibration conditions to implement the vibration test is disposed on the upper portion of the front of the machine 1.

Figure 3:
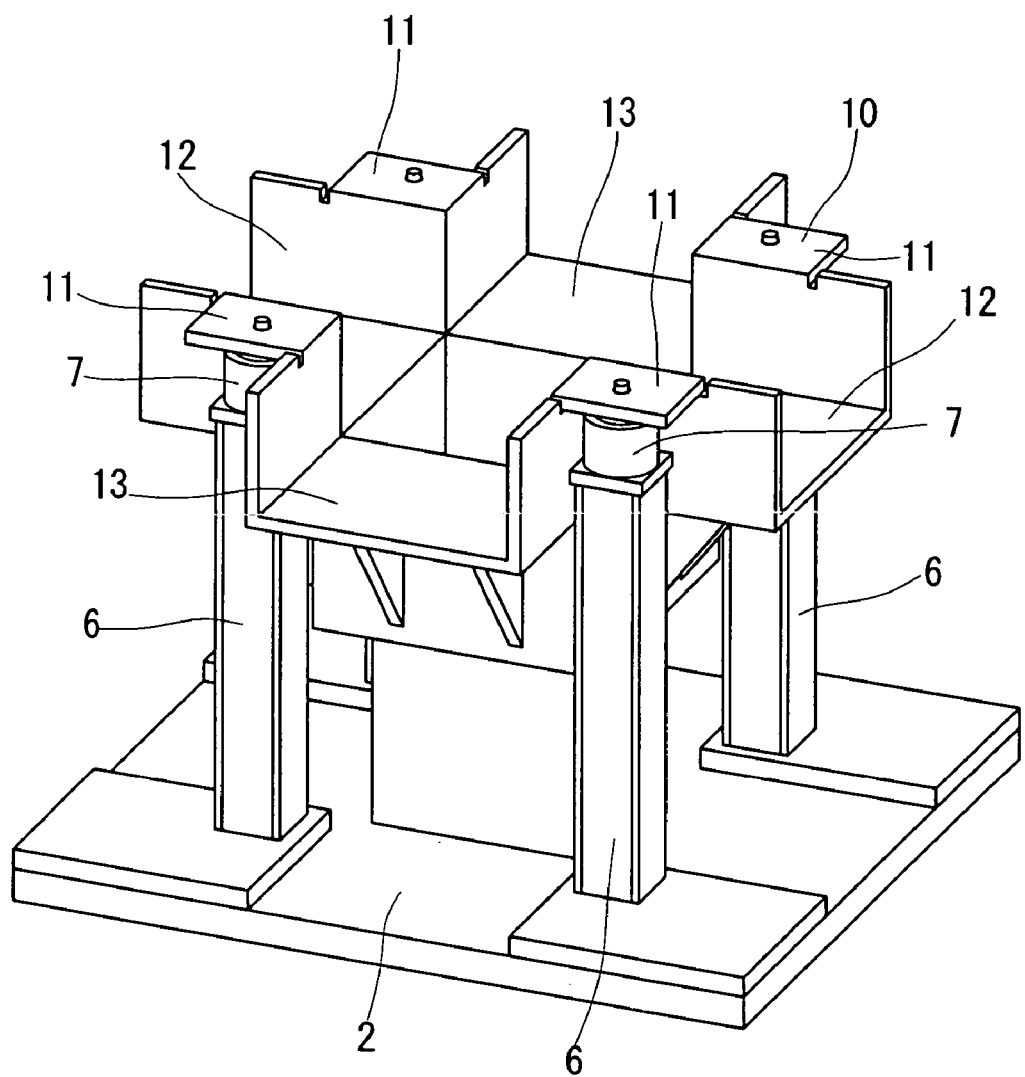
FIG. 3 is an isometric drawing showing a supporting frame in the vibration-testing system according to the embodiment of the present invention.
Figure 4:
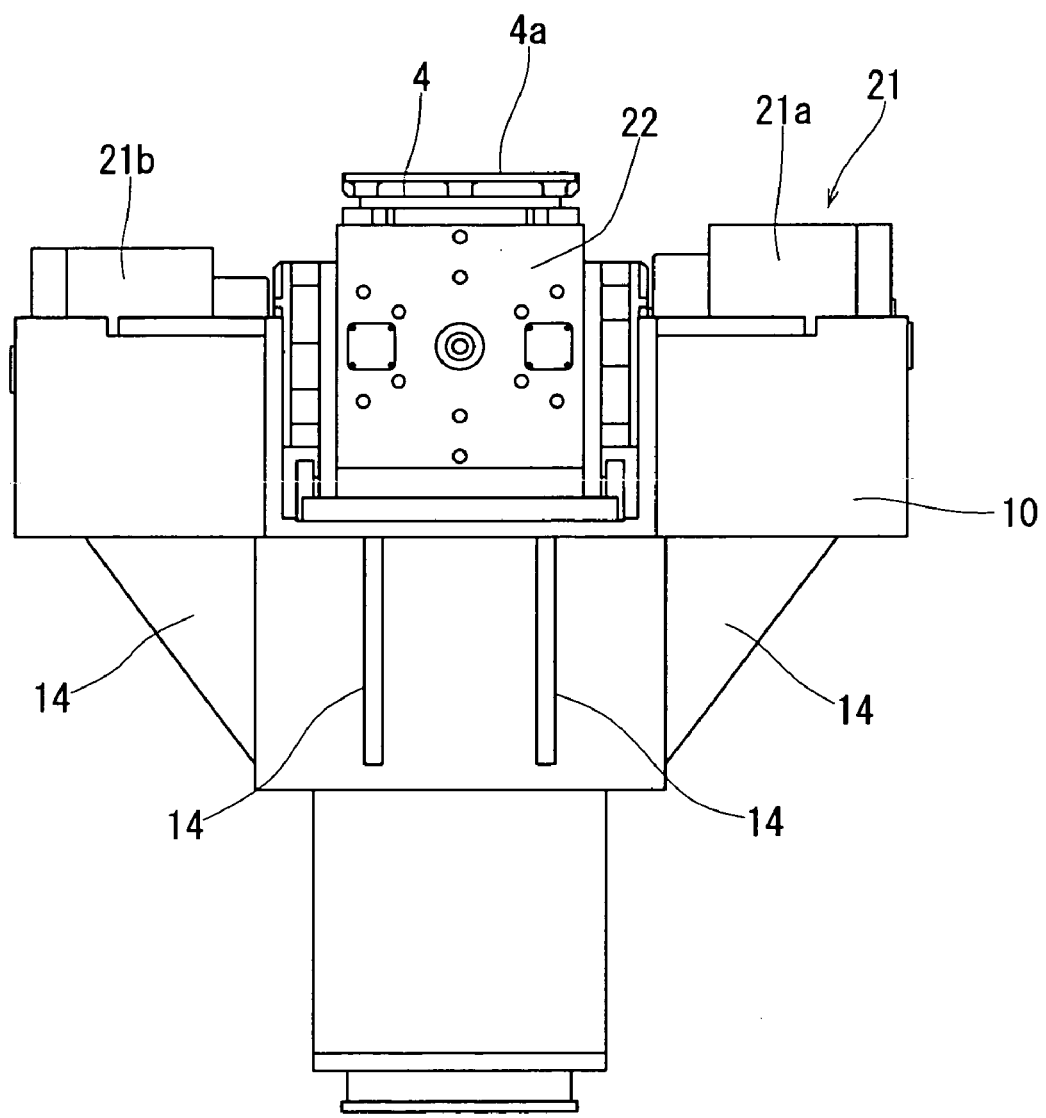
FIG. 4 is a front elevational view showing a state wherein a horizontal vibration generation section is installed on the supporting frame in the vibration-testing system according to the embodiment of the present invention.
Figure 5:
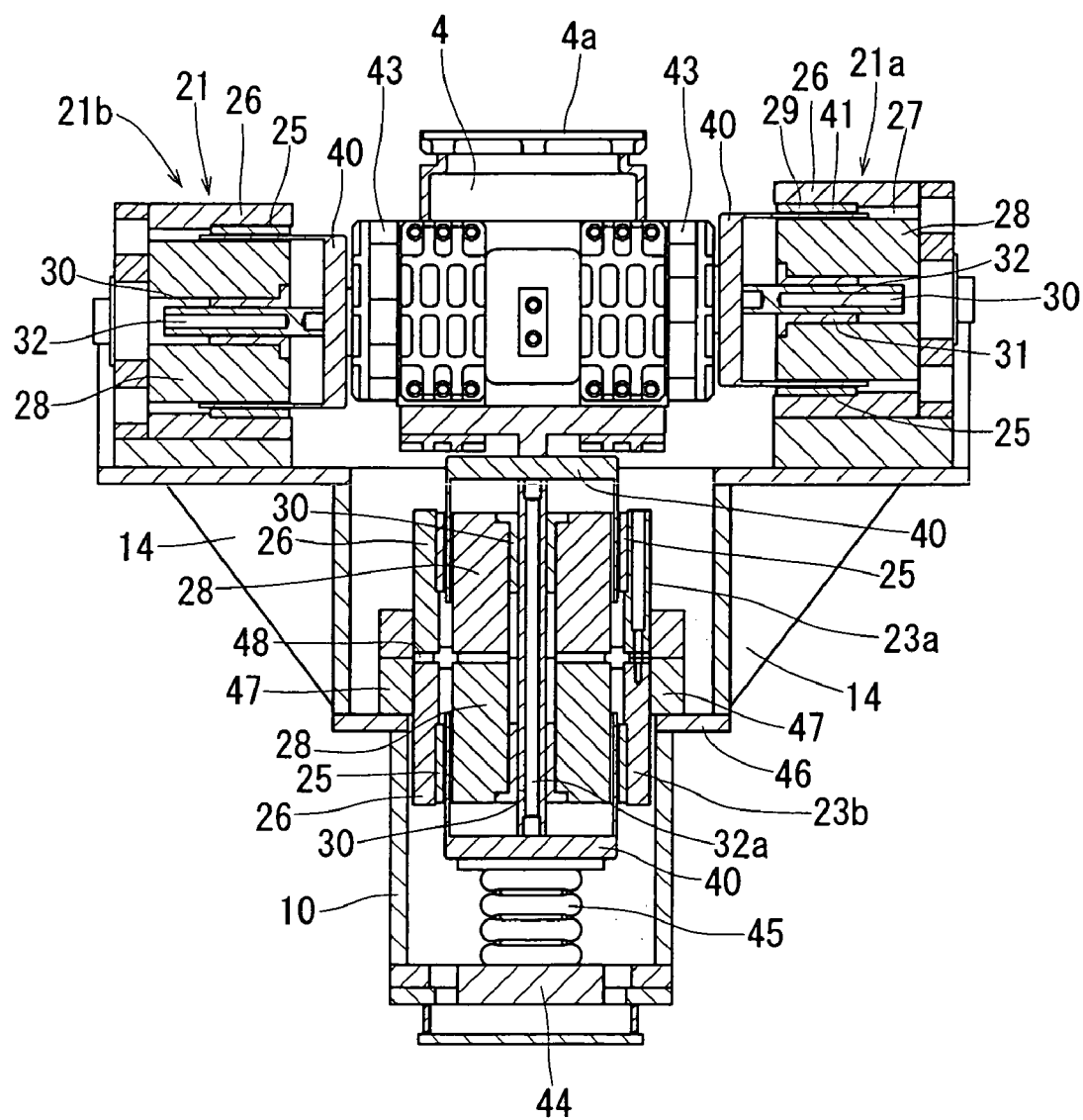
FIG. 5 is a sectional view showing a state wherein the horizontal vibration generation section and a vertical vibration generation section are installed on the supporting frame in the vibration-testing system according to the embodiment of the present invention.
Figure 8:
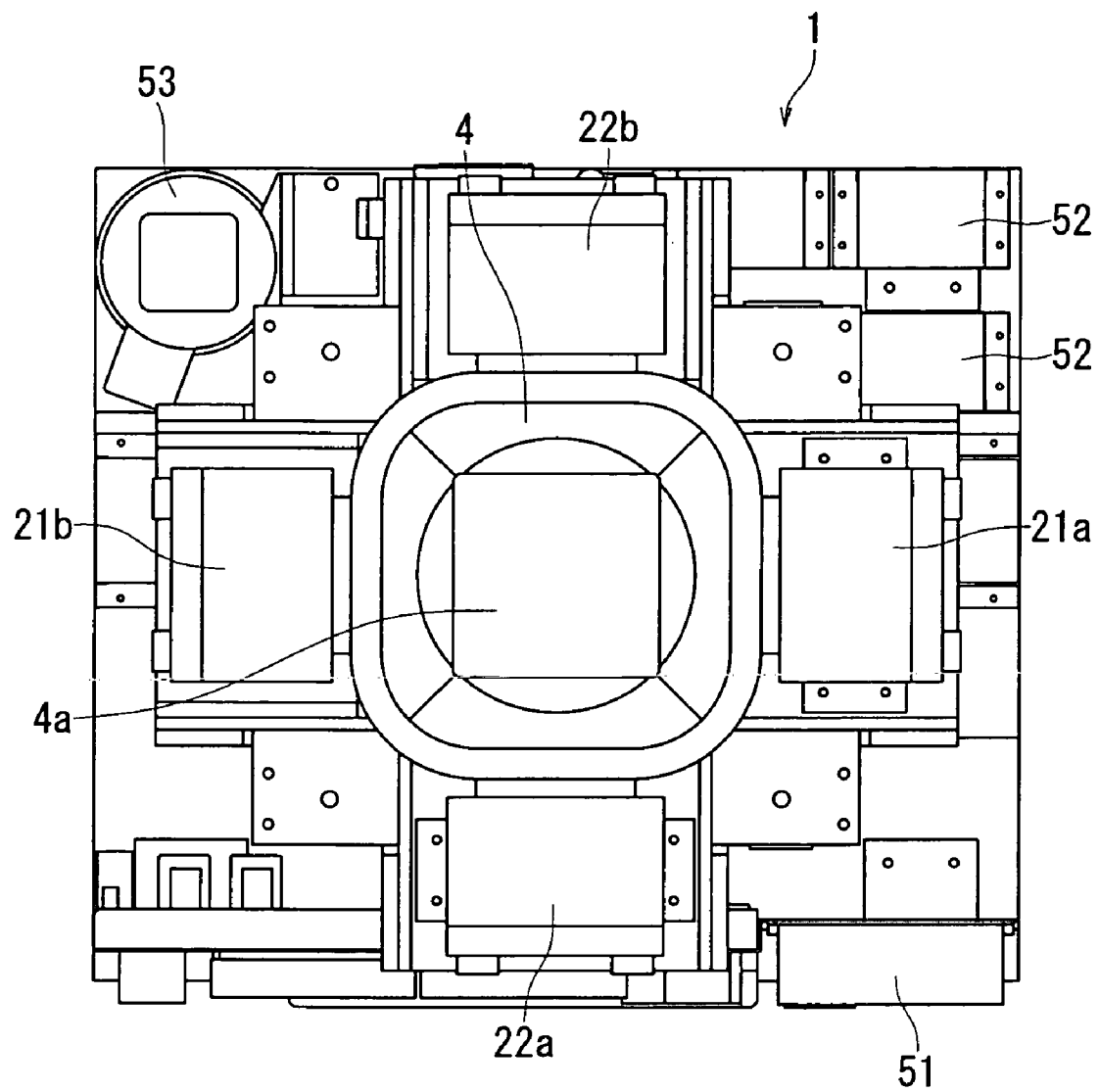
FIG. 8 is a plan view showing an internal structure of the vibration-testing system according to the embodiment of the present invention.

As shown in FIGS. 2 and 3, columnar supports 6 are stuck up on the top of the base 2 at four positions, and a supporting frame 10 is placed on the upper surfaces of the columnar supports 6 through vibration-proof mechanisms 7. Support pieces 11 formed by bending are disposed at four positions in the supporting frame 10 so as to locate on the vibration-proof mechanisms 7, whereby the supporting frame 10 is provided in a floating condition with respect to the base 2. Furthermore, concave placement sections 12 and 13 for placing vibration shakers generating vibrations in X- and Y-directions are prepared at four positions in the right-to-left direction as well as in the anteroposterior direction of the supporting frame 10, respectively. In the right and left placement sections 12 of the supporting frame 10, a pair of horizontal vibration shakers 21a and 21b constituting a horizontal vibration generation section 21 are placed respectively as shown in FIGS. 4, 5, and 8. On one hand, a pair of horizontal vibration shakers 22a and 22b constituting a horizontal vibration generation section 22 and generating vibrations in the Y-direction are placed in the placement sections 13 along the anteroposterior direction of the supporting frame 10, respectively. In addition, two vertical vibration shakers 23a and 23b constituting a vertical vibration generation section 23 and generating vibrations in Z-direction are placed in a cavity formed at the central portion of the supporting frame 10. On the bottom surfaces of the placement sections 12 and 13, brackets 14 each having a substantially triangular section are provided to support a weight of the horizontal vibration generation sections 21 and 22 in the X- and Y-directions.

The horizontal vibration generation section 21 is composed of the pair of the horizontal vibration shakers 21a and 21b, while the horizontal vibration generation section 22 is composed of the pair of the horizontal vibration shakers 22a and 22b, two each of the horizontal vibration shakers are placed along the anteroposterior direction and the right-to-left direction of the supporting frame 10, respectively. Under the circumstances, the two vertical vibration shakers 23a and 23b constituting the vertical vibration generation section 23 are disposed in series along the up and down direction of the supporting frame 10 in order to generate the same vibration force in the Z-direction. Besides, each of the two right-to-left horizontal vibration shakers 21a and 21b, the two anteroposterior vibration shakers 22a and 22b, and the two vertical vibration shakers 23a and 23b are designed to have the same structure as that of the others. In other words, unitization is intended by using the same vibration generation section.

The vibration table 4 is disposed on the top of the vertical vibration generation section 23, and in a place defined between the crossed anteroposterior horizontal vibration generation section 21 in the X-direction and the right-to-left horizontal vibration generation section 22 in the Y-direction. As a result, the vibration table 4 is vibrated by the horizontal vibration generation section 21 in the X-direction, while the vibration table 4 is vibrated by the other horizontal vibration generation section 22 in the Y-direction. Moreover, the vibration table 4 is vibrated by the vertical vibration generation section 23 in the Z-direction. Of course, the vibration table 4 may be vibrated in any arbitrary direction, for example, only in the X-direction, only in the Y-direction, only in the Z-direction, in a two-dimensional direction, or in a three-dimensional direction.

Figure 6:
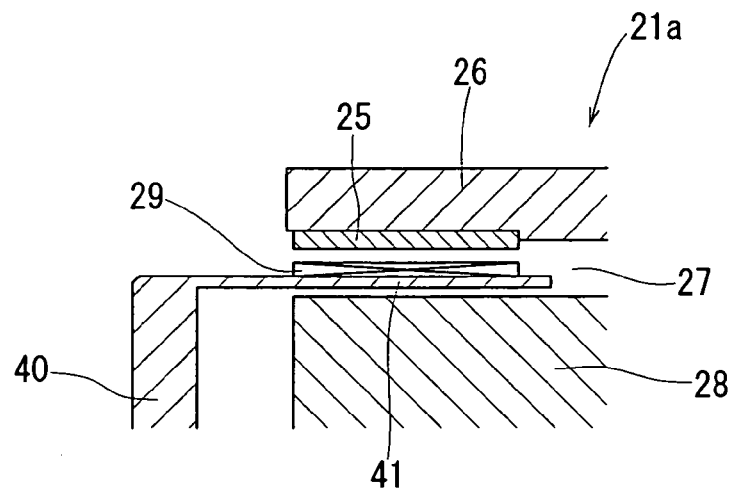
FIG. 6 is an enlarged sectional view showing an essential part of a horizontal vibration shaker in the vibration-testing system according to the embodiment of the present invention.

In the following, either of the horizontal vibration shakers 21a and 21b in the horizontal vibration generation section 21 in the X-direction shown in FIG. 5 will be described, but an explanation for the horizontal vibration generation section 22 in the Y-direction is omitted, because the other horizontal vibration shaker 21b, and the pair of the horizontal vibration shakers 22a and 22b of the horizontal vibration generation section 22 in the Y-direction have the same structure as that of the horizontal vibration shaker 21a. As shown in FIG. 5 and FIG. 6 being an enlarged sectional view showing the essential part of the horizontal vibration shaker 21a, an inner cylindrical section 28 is provided inside an outer cylindrical member 26 constituting an outer shell of the horizontal vibration shaker 21a through a substantially circular groove 27, and a permanent magnet 25 is disposed on an inner circumferential surface on the extreme end side of the outer cylindrical member 26. On one hand, a circumferential side section 41 of a movable member 40 functioning to vibrate the vibration table 4 and having a substantially U-shaped section laid down at 90° is loosely fitted into the groove 27 in a reciprocatingly movable manner, and a driving coil 29 is wound around an outer circumferential surface of the circumferential side section 41 of a movable member 40. A bearing section 30 is provided in the central portion of the inner cylindrical section 28, and an outer cylinder 31 of the bearing section 30 is secured to the inner circumferential surface of the inner cylindrical section 28, whereby a shaft 32 being an axis of the bearing section 30 is slidable through a ball in the axial direction thereof. The extreme end of the shaft 32 is linked to secure with respect to the central part of an inner surface of the movable member 40, and the circumferential side section 41 of the movable member 40 is inserted slidably into the groove 27.

It is arranged in such that an alternating current is applied to the driving coil 29 of the horizontal vibration shaker 21a as a control signal of an arbitrary frequency to generate a magnetic circuit, so that the movable member 40 is reciprocated with a predetermined frequency by means of a magnetic force due to the magnetic flux. When directions of magnetic fluxes of the right and left horizontal vibration shakers 21a and 21b are allowed to differ from one another, movable members 40 are driven in the same direction, respectively, whereby the vibration table 4 is reciprocated with the predetermined frequency. Furthermore, sides of the vibration table 4 are provided with bearings 43, respectively, and an oil is circulated to the bearings 43 from a hydraulic pump unit 53 which will be mentioned later, whereby an oil slide surface wherein side surfaces of the bearings 43 slide with respect to the extreme end surface of the movable member 40 of the horizontal vibration shakers 21a and 21b in the X-direction (the horizontal vibration shakers 22a and 22b in the Y-direction) by means of oil films derived from the oil is formed. As a result, the vibration table 4 comes to be in smooth contact with the movable member 40 of the horizontal vibration generation section 21, 22 in a slidable manner, and further the vibration table 4 is slidably in contact with a vertical movement of the vertical vibration generation section 23.

Since the constitution of the two vertical vibration shakers 23a and 23b constituting the vertical vibration generation section 23 is the same as that of the above-mentioned horizontal vibration shaker 21a, a detailed description thereof is omitted, but explained schematically. As shown in FIG. 5, the vertical vibration shaker 23a on the upper side is disposed under a movable member 40, while the vertical vibration shaker 23b on the lower side is disposed over another movable member 40. In this arrangement, the movable member 40 of the vertical vibration shaker 23b on the lower side is in a state wherein it is rested on an air suspension 45 placed on a bottom 44 of the supporting frame 10. A shaft 32a of the bearing sections 30 and 30 in the top-to-bottom vertical vibration shakers 23a and 23b is formed lengthwise to be a structure wherein the upper and the lower bearing sections 30 are linked to each other, and the one shaft 32a functions as its axis of the vertical vibration generation section 23 composed of the two vertical vibration shakers 23a and 23b. The movable member 40 of the vertical vibration shaker 23a on the upper side is linked and fixed to the upper end of the shaft 32a, while the movable member 40 of the vertical vibration shaker 23b on the lower side is linked and fixed to the lower end of the shaft 32a.

Figure 7:
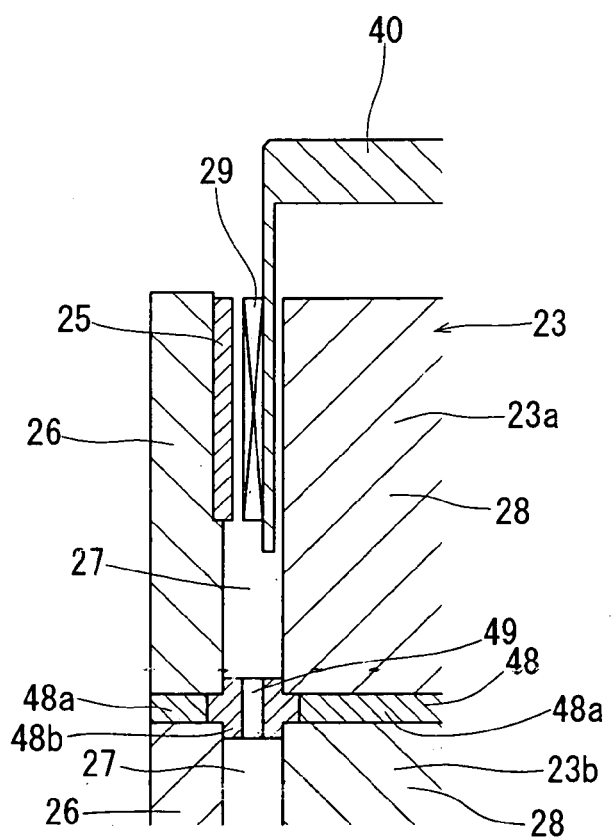
FIG. 7 is an enlarged sectional view showing an essential part of a vertical vibration generation section in the vibration-testing system according to the embodiment of the present invention.

The vertical vibration generation section 23 is secured onto a stepped portion 46 of the supporting frame 10 through a supporting section 47, and a partition plate 48 is interposed between the upper and the lower vertical vibration shakers 23a and 23b as shown in FIG. 7. In the partition plate 48, portions corresponding to the outer cylindrical member 26 and the inner cylindrical section 28 are composed of a magnetic material portion 48a, while a portion corresponding to the groove 27 is composed of a nonmagnetic material portion 48b, and further a bore 49 communicating with the top-to-bottom groove 27 is drilled in the nonmagnetic material portion 48b. The nonmagnetic material portion 48b of the partition plate 48 prevents from mutual interference of the driving coil 29, and it is arranged in such that the oil for forming an oil film used in the bearing 43 is flowed through the groove 27 and the bore 49, whereby the driving coil 29 is cooled. The upper part and the lower part of the top-to-bottom groove 27 are opened, respectively, in other words, the top and the bottom of the groove 27 are communicated with the outside.

Since the upper vertical shaker 23a is reversed to the lower vertical shaker 23b, directions of magnetic fluxes due to magnetic circuits produced in the driving coils 29 of the upper and the lower vertical vibration shakers 23a and 23b are also reversed, so that the two independent magnetic circuits due to the upper and the lower vertical vibration shakers 23a and 23b are in the form wherein they are serially combined with each other. Due to the arrangement as described above, when the two vertical vibration shakers 23a and 23b are driven with a predetermined frequency, the upper and the lower movable members 40 are driven in the same direction and reciprocated. Thus, it results in a serial combination of two independent magnetic circuits derived from the upper and the lower vertical vibration shakers 23a and 23b, whereby two times higher vibration force can be produced by the two vertical vibration shakers 23a and 23b as compared with a case where one vertical vibration shaker 23a (23b) is used. As a result, the two vertical vibration shakers 23a and 23b produce the same vibration force as those of the horizontal vibration generation sections 21 and 22 provided in the anteroposterior and the right-to-left directions, respectively, so that the vibration table 4 can be vibrated.

Since the two upper and lower vertical vibration shakers 23a and 23b have the same constitutions as those of the respective horizontal vibration shakers 21a, 21b, 22a, and 22b in the horizontal vibration generation sections 21 and 22 other than the shaft part 32a, the identical design may be applied to an individual vibration shaker, whereby the vibration shaker can be unitized, resulting in reduction of a cost and an easy maintenance.

As mentioned above, the anteroposterior and the right-to-left horizontal vibration generation sections 21 and 22 are disposed in the upper surface of the supporting frame 10, while the vertical vibration generation section 23 is disposed inside the supporting frame 10. Respective members (unit) constituting the vibration-testing system 1 are disposed as described hereinafter by using an open area in a space surrounding the supporting frame 10.

Figure 9:
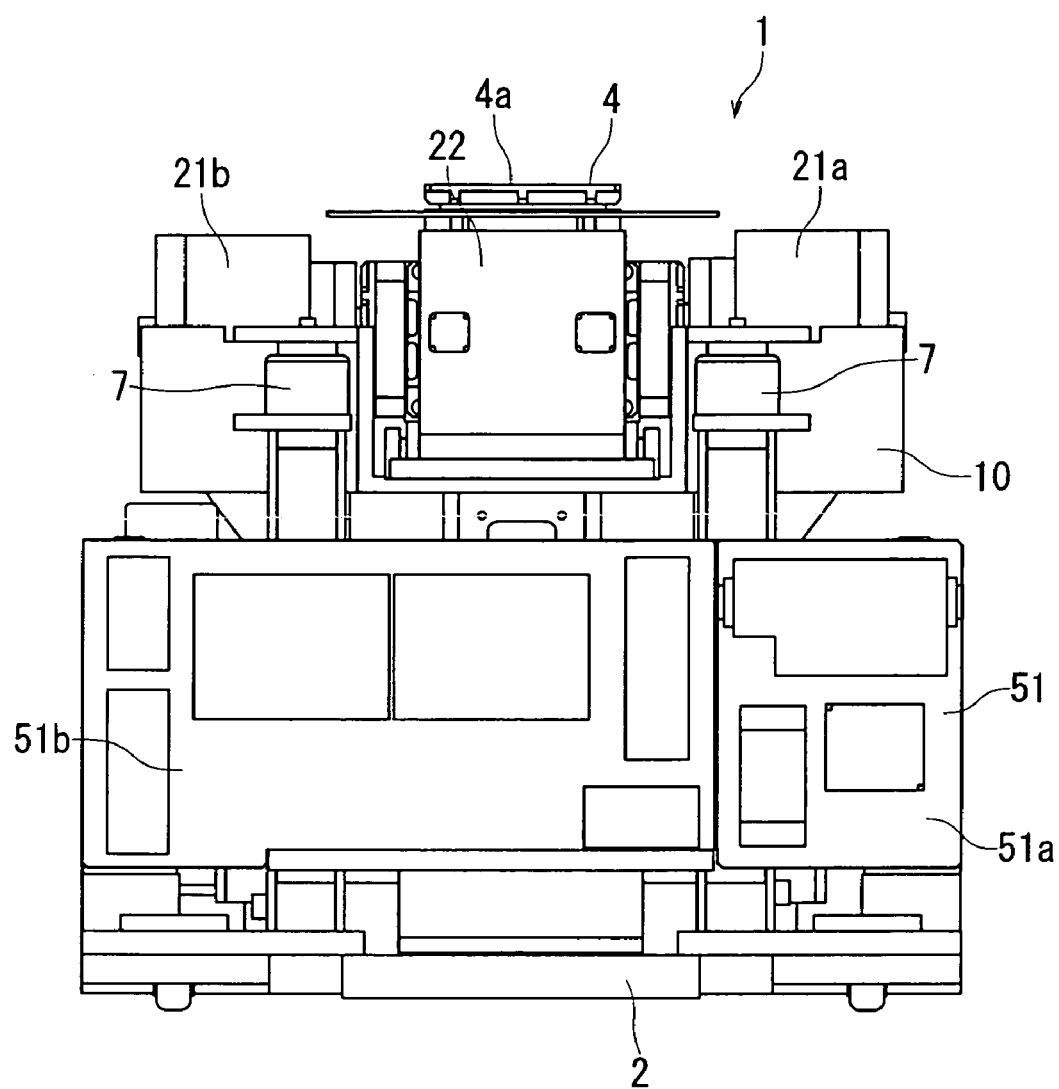
FIG. 9 is a front elevational view showing the internal structure of the vibration-testing system according to the embodiment of the present invention.
Figure 10:
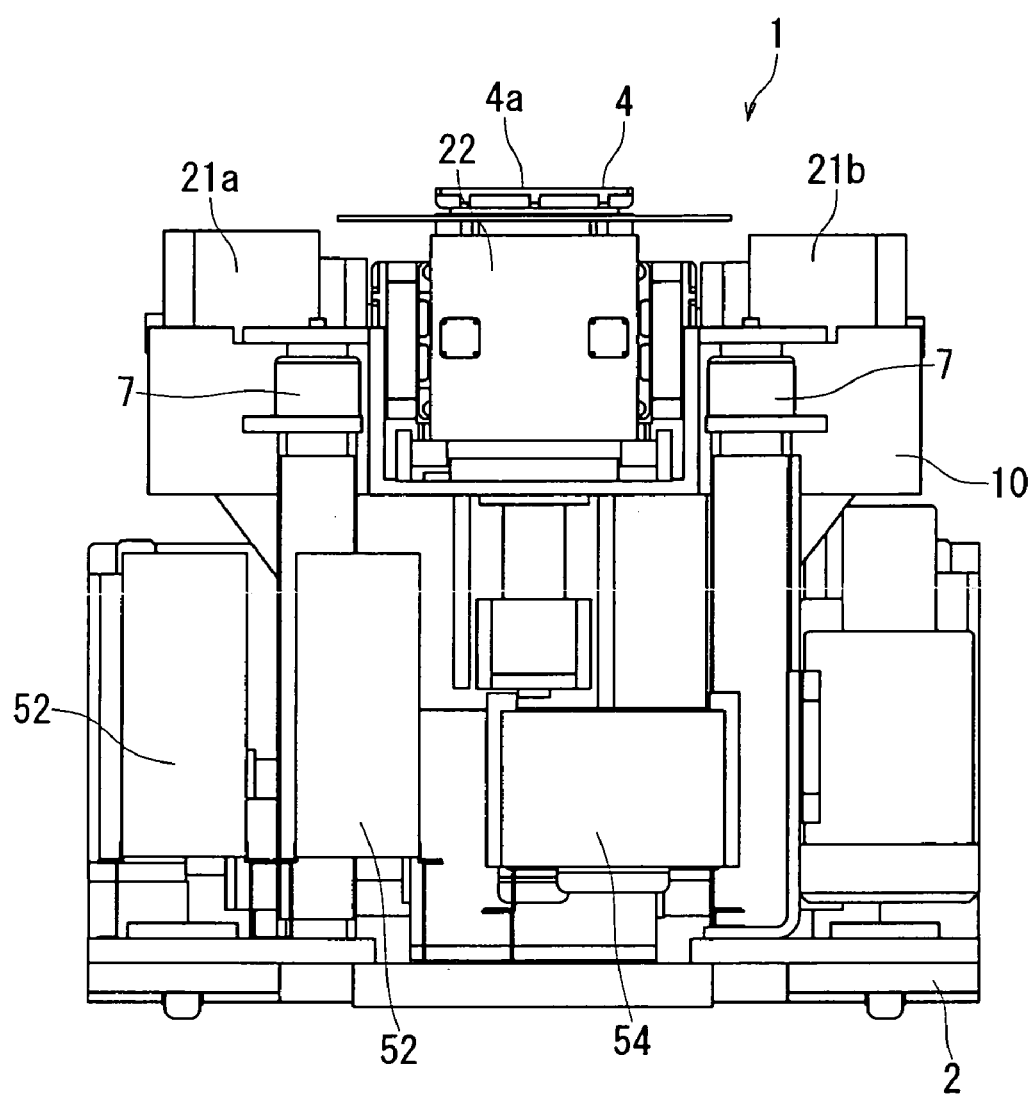
FIG. 10 is a rear elevational view showing the internal structure of the vibration-testing system according to the embodiment of the present invention.
Figure 11:
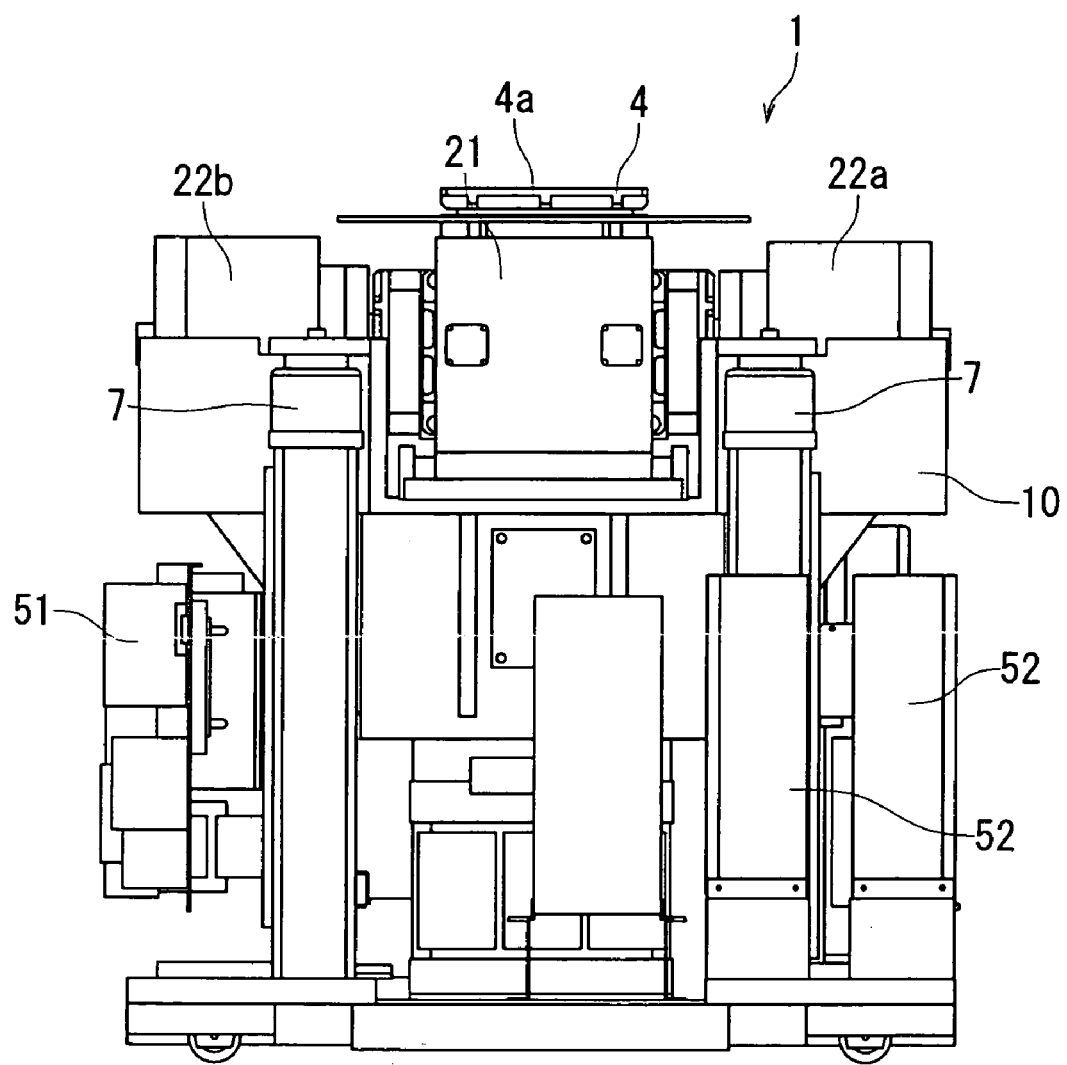
FIG. 11 is a right side elevational view showing the internal structure of the vibration-testing system according to the embodiment of the present invention.
Figure 12:
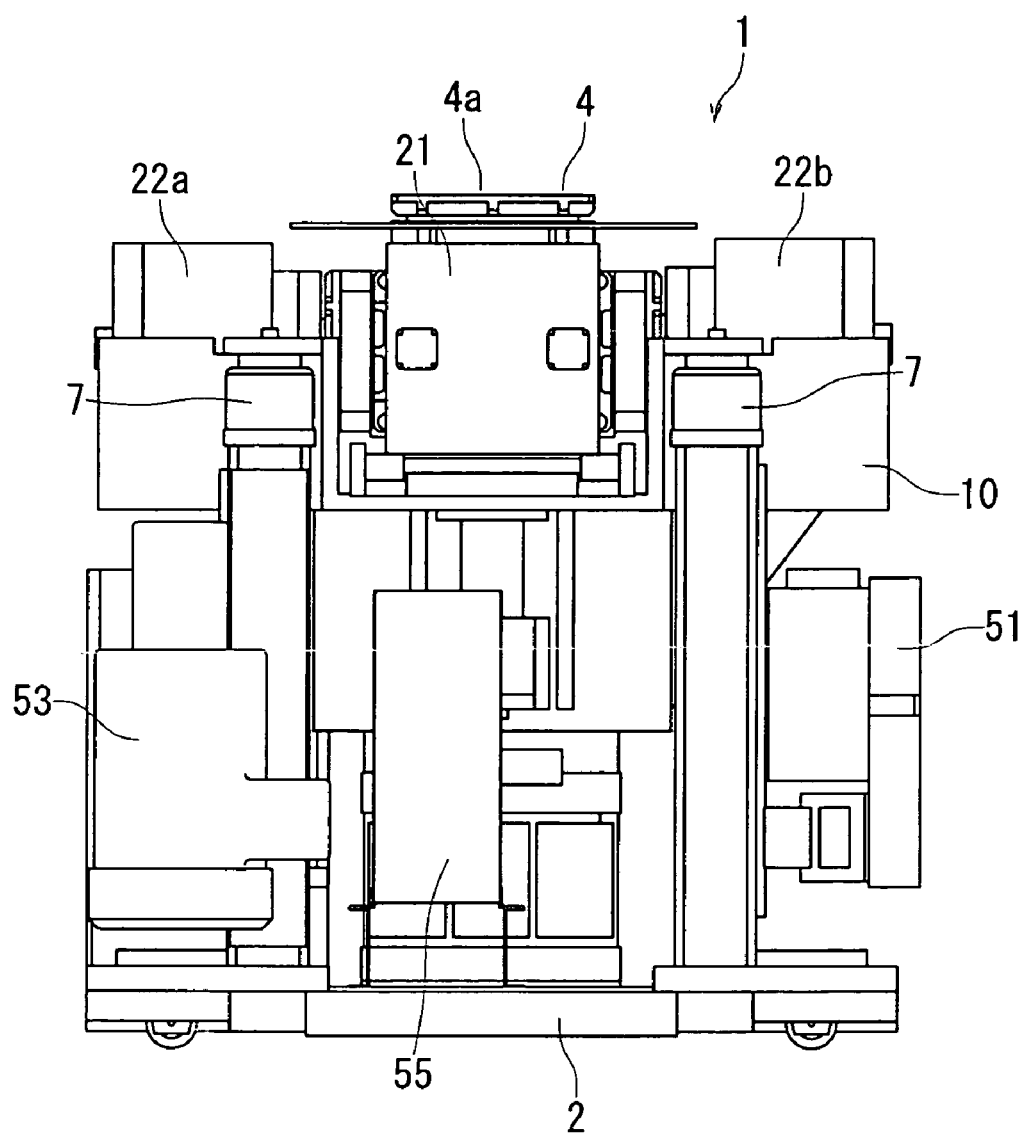
FIG. 12 is a left side elevational view showing the internal structure of the vibration-testing system according to the embodiment of the present invention.
Figure 13:
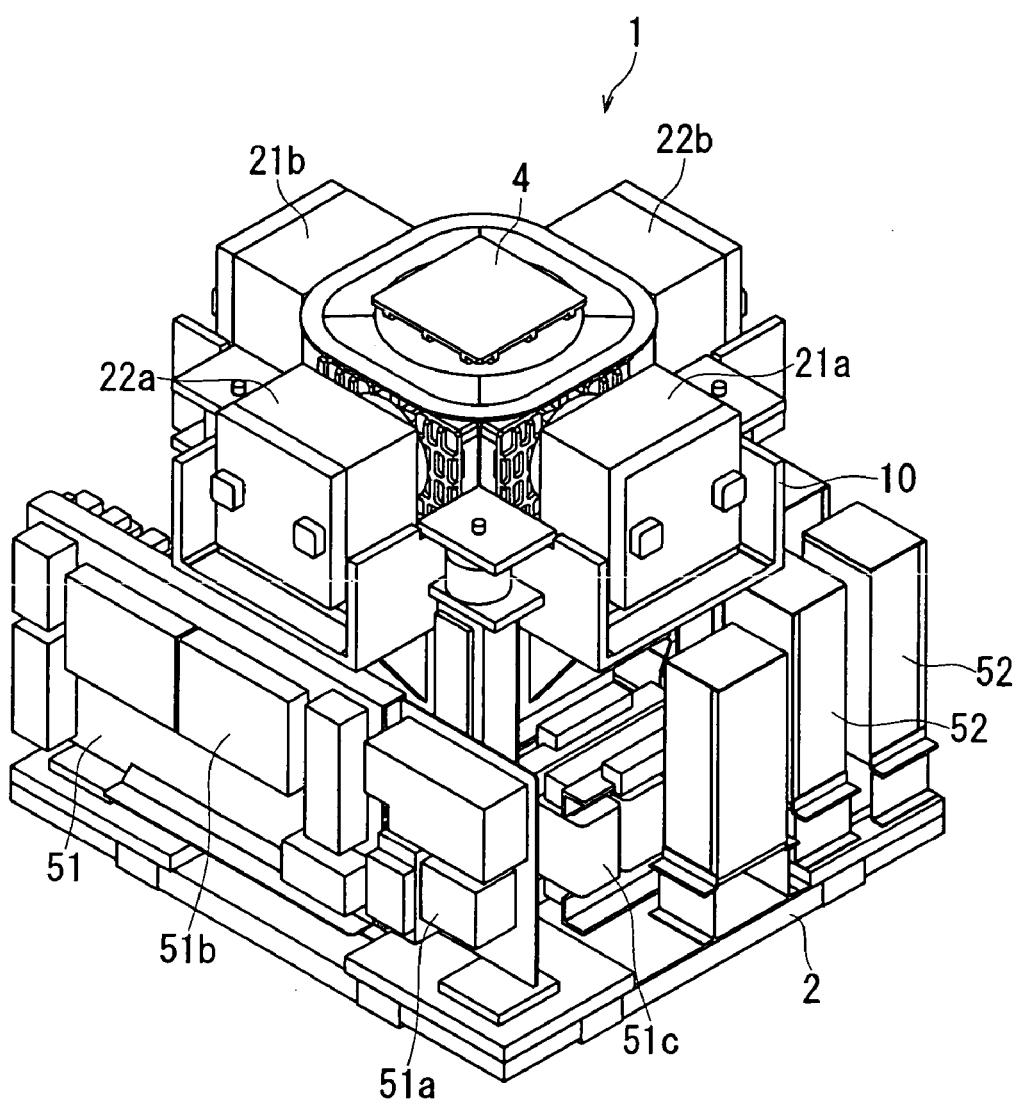
FIG. 13 is an isometric drawing showing the internal structure of the vibration-testing system according to the embodiment of the present invention viewed from the front direction thereof.
Figure 14:
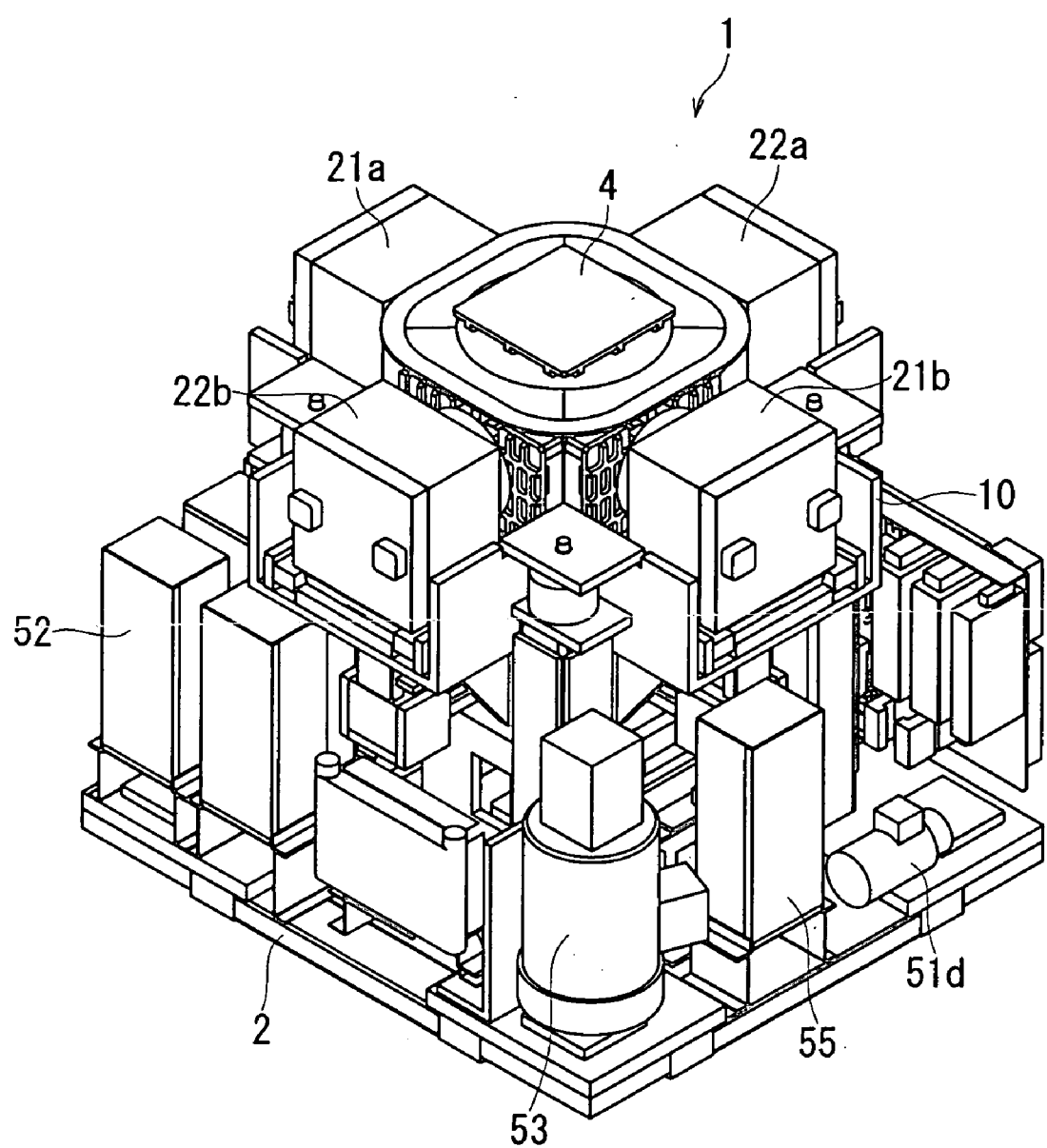
FIG. 14 is an isometric drawing showing the internal structure of the vibration-testing system according to the embodiment of the present invention viewed from the rear direction thereof.

FIGS. 8 to 14 are views each showing an internal structure of the vibration-testing system 1 from which the casing 3 is removed wherein FIG. 8 is a plan view, FIG. 9 is a front elevational view, FIG. 10 is a rear elevational view, FIG. 11 is a right side view, FIG. 12 is a left side view, and FIG. 13 is a left side view; and these views show the vibration-testing system 1 without the casing 3, respectively. Furthermore, FIG. 13 is an isometric drawing showing the vibration-testing system 1 viewed from the front direction thereof, while FIG. 14 is an isometric drawing showing the vibration-testing system 1 viewed from the rear direction thereof. In FIGS. 8 to 14, a power supply section 51 for supplying an electric power to the whole system is provided on the front right side of the base 2 of the vibration-testing system 1, while a plurality of power modules 52 for receiving supply of the power source from the power supply section 51 to deliver an electric power (AC signal for control) to the respective horizontal vibration generation sections 21 and 22, and the vertical vibration generation section 23 are provided on the rear right side of the base 2. Moreover, a hydraulic pump unit 53 being a source for supplying an oil in case of controlling an oil pressure is disposed on the rear left of the base 2, and a cooling blower 54 for cooling the whole system is provided on the rear center of the base 2. A main body section 55 composed of a control circuit constituting a controller together with the operation panel 5 is disposed on the left side of the base 2.

Figure 15:
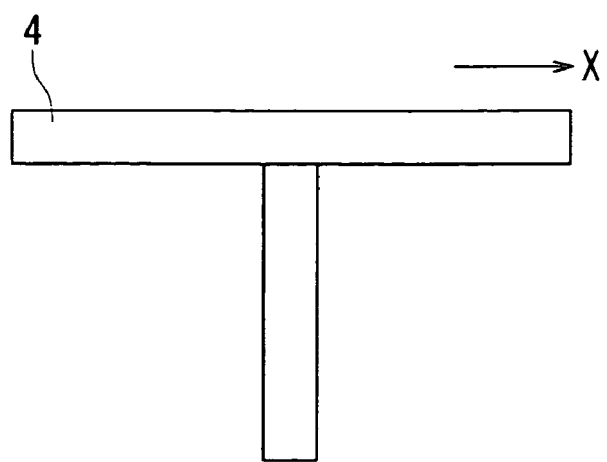
FIG. 15 is an explanatory view for explaining a rotational mode in the vibration-testing system according to the embodiment of the present invention.
Figure 16:
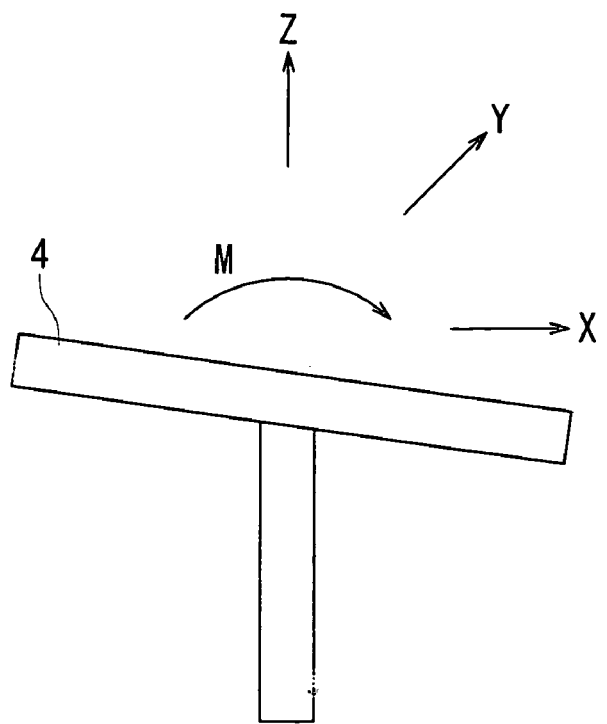
FIG. 16 is another explanatory view for explaining a rotational mode in the vibration-testing system according to the embodiment of the present invention.

In the following, suppression of a rotational mode being the subject matter of the invention will be described. In the case where an accelerated velocity due to the horizontal vibration shakers 21a and 21b in the X-direction is controlled at constant as shown in FIG. 15, a control accelerated velocity responds at constant in the horizontal vibration shakers 21a and 21b in the X-direction, while an acceleration response becomes zero in both the Y- and Z-directions so far as no rotational mode appears, when acceleration responses in the X-, Y-, and Z-directions are considered. However, as shown in FIG. 16, when a rotational mode M appears, a control accelerated velocity responds at constant in the X-direction, but an accelerated velocity appears in the Y-direction due to the rotational mode M, and an accelerated velocity appears also in the Z-direction due to the rotational mode M.

Under the circumstances, the above acceleration responses are measured by an acceleration sensor provided on the vibration table 4, an output from the acceleration sensor is fed back to the main body section 55 functioning as a control circuit, one horizontal vibration shaker 21a is transferred vertically to give a positional difference (offset) in a horizontal vibration axis 63 which will be mentioned later, and in addition, vibration forces of the horizontal vibration shakers 21a and 21b are changed. Thus, a moment is applied in a direction for cancelling the rotational mode M to suppress the rotational mode M, in other words, the moment is cancelled.

Figure 17:
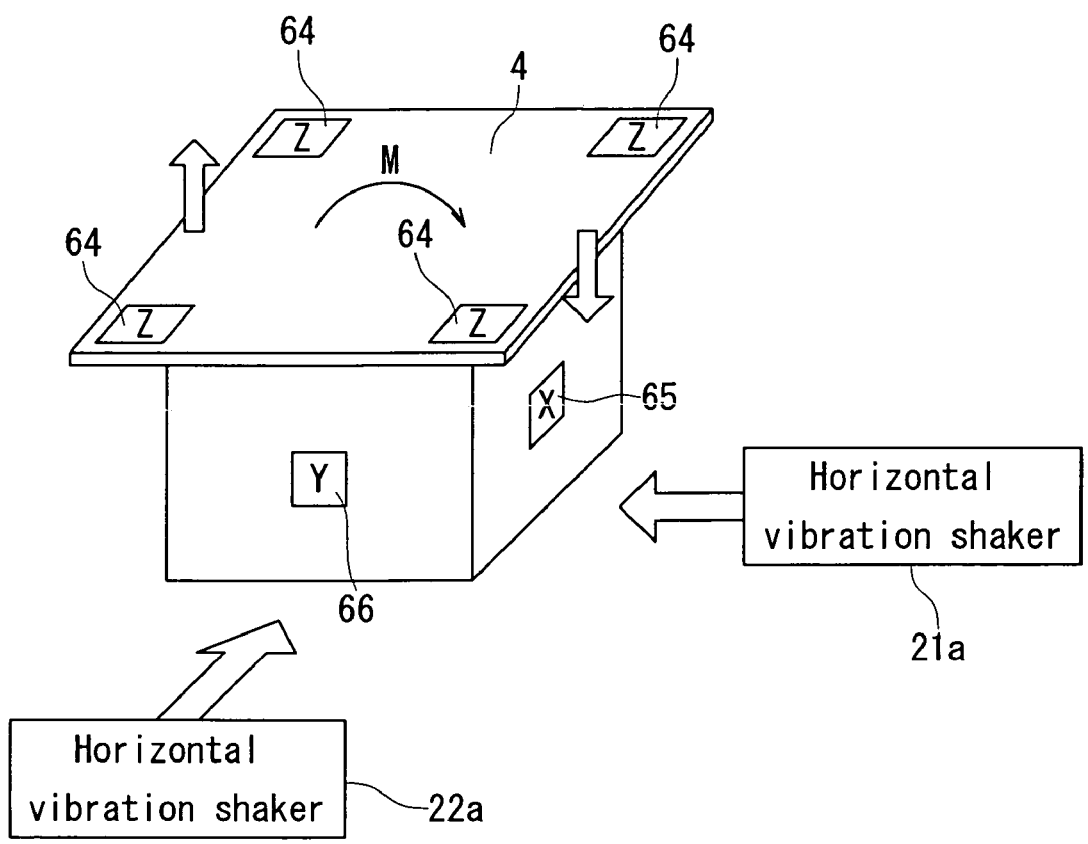
FIG. 17 is a view wherein an acceleration sensor is applied to the vibration-testing system according to the embodiment of the present invention.
Figure 18:
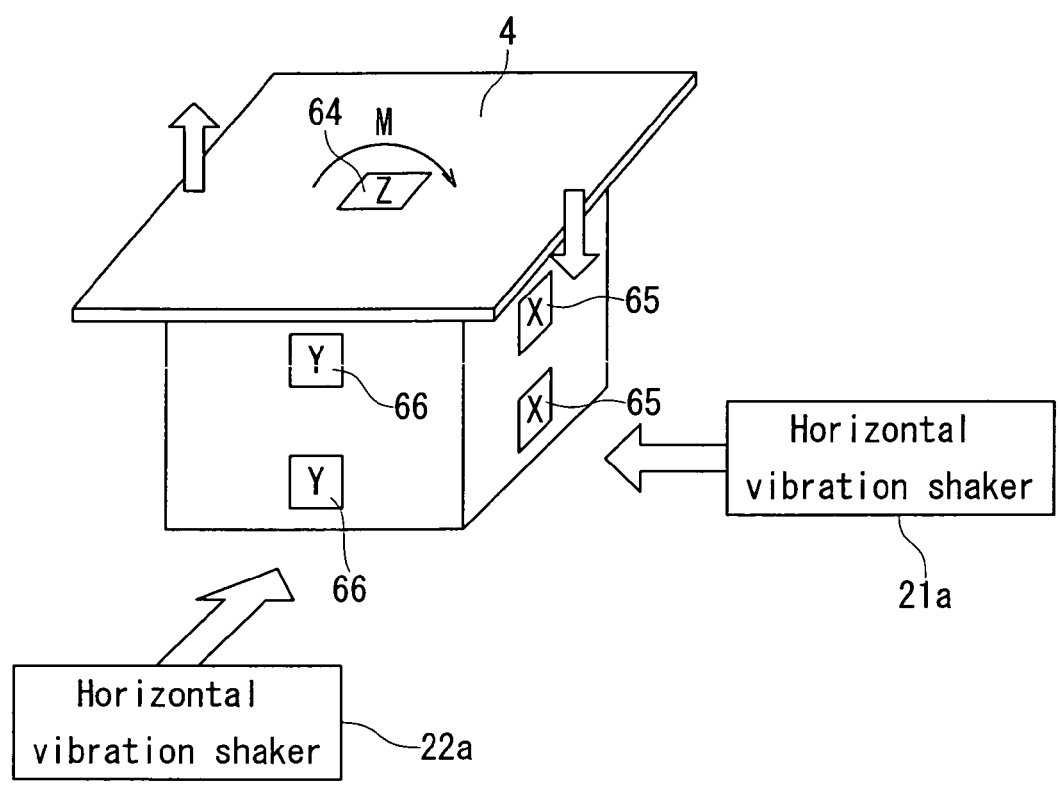
FIG. 18 is a view showing another example wherein an acceleration sensor is applied to the vibration-testing system according to the embodiment of the present invention.

FIG. 17 shows an example of laying out the above-described acceleration sensors wherein Z-direction acceleration sensors 64 are disposed at four corners on the top of the vibration table 4, X-direction acceleration sensors 65 and Y-direction acceleration sensors 66 are provided on the sides of the vibration table 4, respectively. Namely, the Z-direction acceleration sensors 64 are provided to detect a phase difference (rotational mode M) on the surface of the vibration table 4. FIG. 18 shows another example of laying out the acceleration sensors wherein the Z-direction acceleration sensor 64 is disposed on the top of the vibration table 4 in the substantially central portion thereof, the two X-direction acceleration sensors 65 are disposed at the upper and the lower positions on a side of the vibration table 4, and the two Y-direction acceleration sensors 66 are disposed at the upper and the lower positions on another side of the vibration table 4 wherein a phase difference (rotational mode M) is detected by providing the acceleration sensors at positions different from one another. In the latter example, since the number of acceleration sensors is smaller than that of FIG. 18, the cost can be reduced. In case of FIG. 18, however, an acceleration response due to the rotational mode M can be more correctly detected. A position at which an acceleration sensor is to be disposed may be any place so far as the rotational mode M can be recognized at the position. When the rotational mode M is recognized to control it, the rotational mode M can be suppressed.

Figure 19:
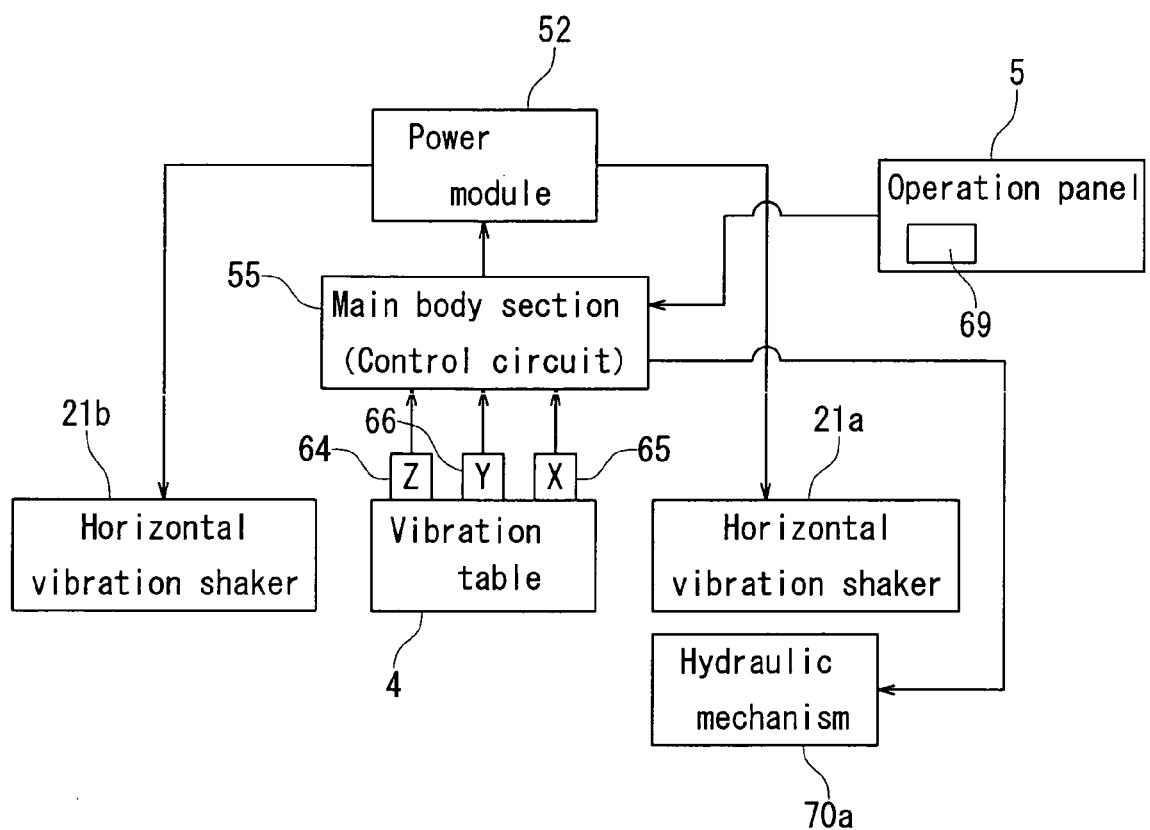
FIG. 19 is a control block diagram for controlling a rotational mode in the vibration-testing system according to the embodiment of the present invention.

FIG. 19 shows a control block diagram for the purpose of suppressing or eliminating the above-described rotational mode M wherein detection signals of the respective acceleration sensors 64 to 66 disposed on the vibration table 4 are input to the main body section 55 functioning as a control circuit, and the power module 52 is controlled on the basis of the signals from these respective sensors 64 to 66 to make vibration forces of the horizontal vibration shakers 21a and 21b variable. Further, on the lower surface side of either of the horizontal vibration shakers, e.g. 21a, hydraulic mechanism sections 70a for moving vertically the horizontal vibration shaker 21a is provided. These hydraulic mechanism sections 70a are adapted to be moved vertically by control signals from the main body section 55 based on the signals from the acceleration sensors 64 to 66 likewise as described above.

In addition, a moment cancel switch 69 by which implementing whether or not a basic control, i.e. moment cancelling can be selected is provided onto the operation panel 5.

Figure 20:
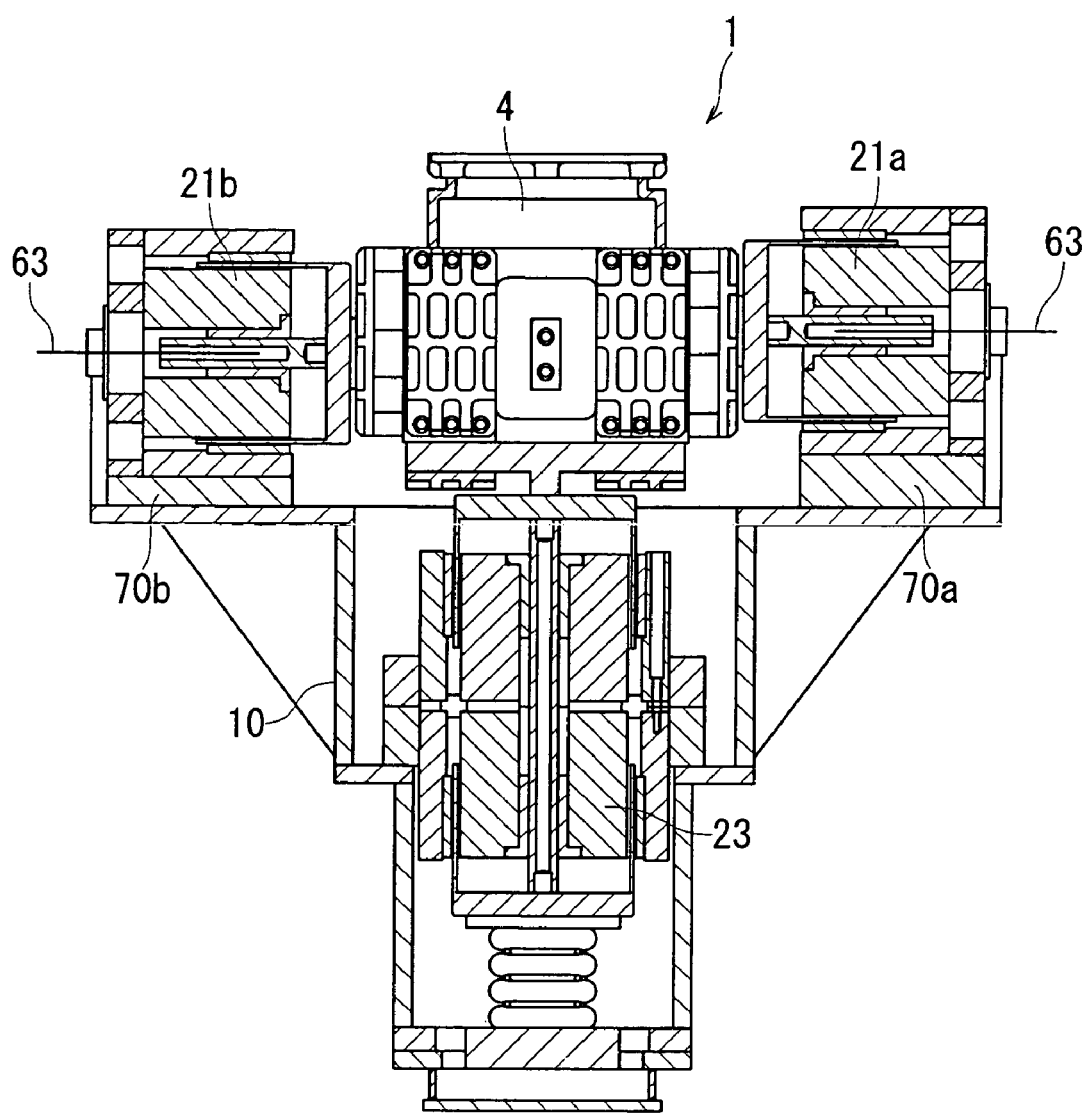
FIG. 20 is a view showing a horizontal vibration axis in the vibration-testing system according to the embodiment of the present invention.
Figure 21:
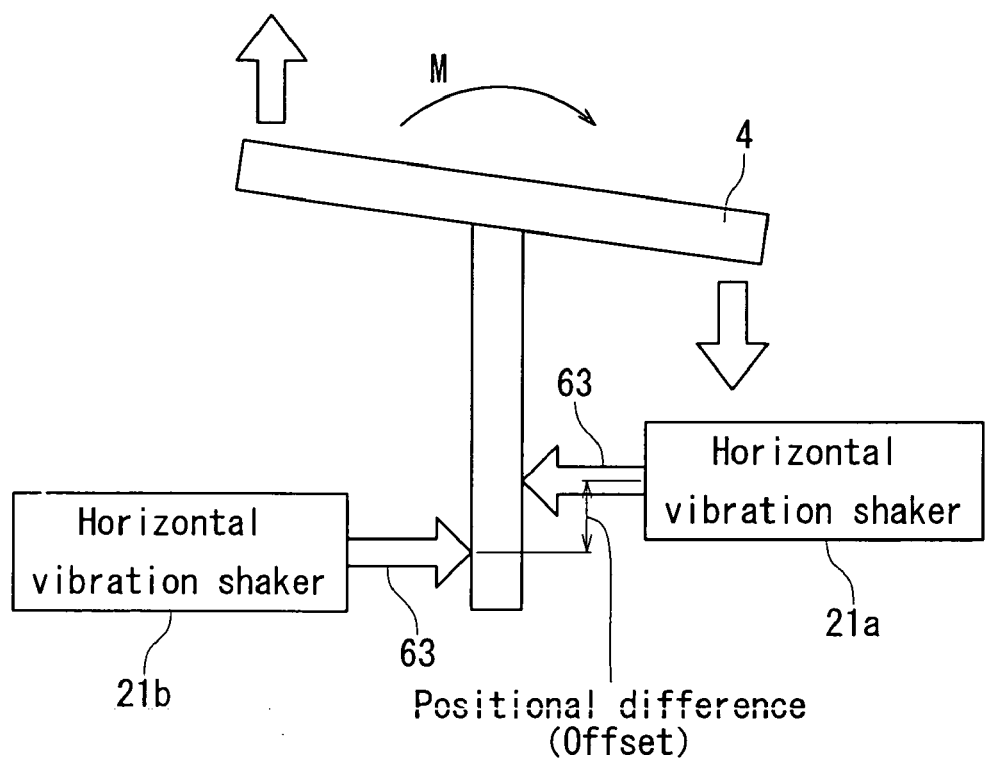
FIG. 21 is an explanatory view for explaining a case where the rotational mode is suppressed and controlled in the vibration-testing system according to the embodiment of the present invention.

FIG. 20 shows a position of a horizontal vibration axis 63 in the horizontal vibration shakers 21a and 21b wherein it corresponds to a part of the shaft 32 of the horizontal vibration shakers 21a and 21b. In this arrangement, when the rotational mode M appears, one of the horizontal vibration shakers, i.e. 21a, is moved vertically so as to produce a positional difference (offset) with respect to a horizontal vibration axis of the other horizontal vibration shaker 21b. In other words, when the vibration table 4 is vibrated by means of the horizontal vibration shakers 21a and 21b in the X-direction, the rotational mode M appears, so that an accelerated velocity is detected by the acceleration sensors 64 to 66, whereby a detection signal is input to the main body section 55. For example, it is supposed that an accelerated velocity appears upwards on the left of the vibration table 4, while an accelerated velocity appears downwards on the right of the vibration table 4 due to production of the rotational mode M as shown in FIG. 21, the main body section 55 drives the hydraulic mechanism sections 70a to elevate one of the horizontal vibration shakers, i.e. 21a, so that a positional difference (offset) is produced with respect to the horizontal vibration axis 63 of the opposed other horizontal vibration shaker 21b. At the same time, vibration forces of both the horizontal vibration shakers 21a and 21b are varied to apply a moment which functions to cancel the above-described rotational mode M appeared with respect to the vibration table 4, so that the moment is balanced, whereby the rotational mode M can be suppressed.

In the above description, although a case where the horizontal vibration shakers 21a and 21b in the X-direction are vibrated has been explained, it is controlled also in the case where the horizontal vibration shakers 22a and 22b are vibrated in only the Y-direction according to the same manner, whereby the rotational mode M is suppressed. Moreover, even when a rotational mode M is produced by vibrating the horizontal vibration shakers 21a and 21b in the X-direction and the horizontal vibration shakers 22a and 22b in the Y-direction at the same time, either of the opposite horizontal vibration shakers is moved vertically to produce a positional difference (offset), whereby the rotational mode M is suppressed.

Figure 22:
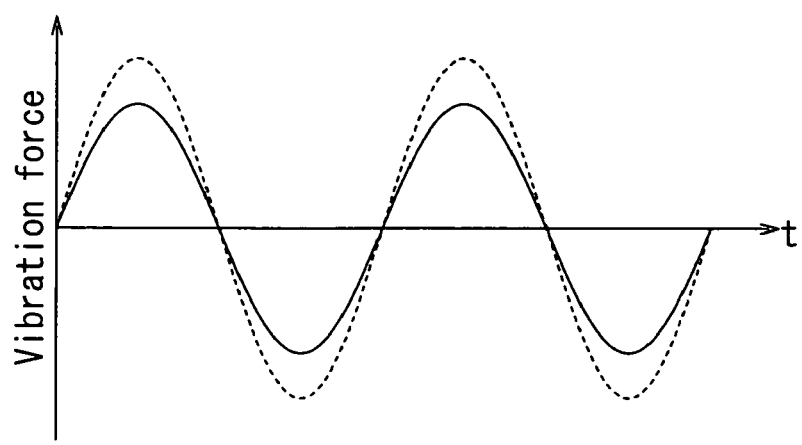
FIG. 22 is a wave form chart showing a vibration force in case of accompanying with or without suppression of the rotational mode in the vibration-testing system according to the embodiment of the present invention.
Figure 23:
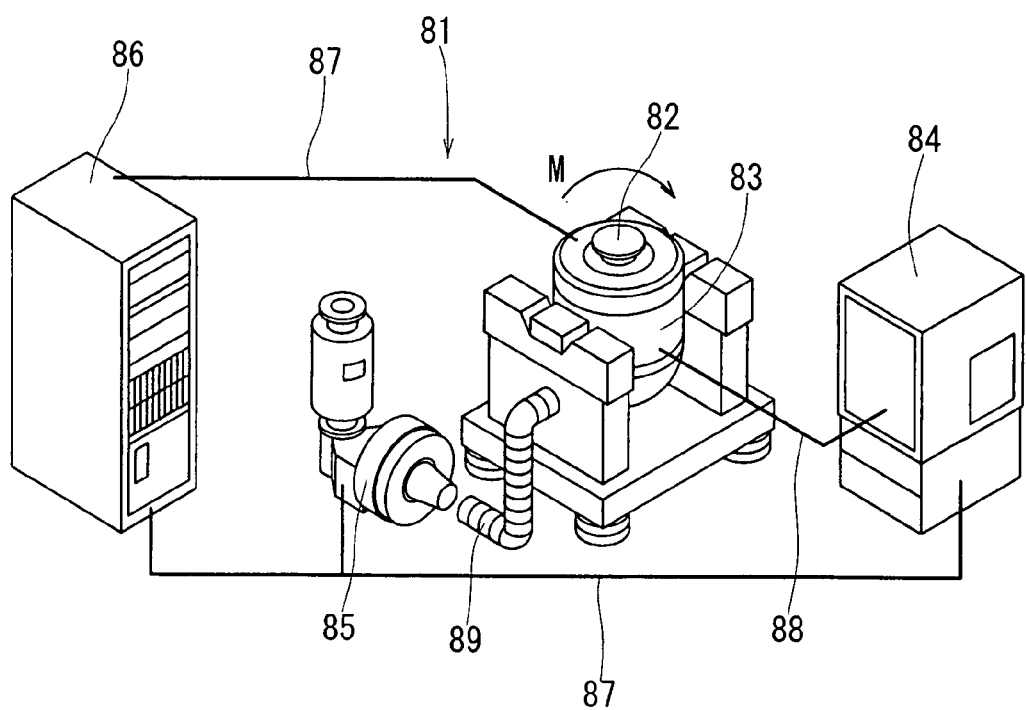
FIG. 23 is an isometric drawing showing a constitution of a vibration-testing system in a conventional example.

In this arrangement, when the above-described moment cancel switch 69 is pressed, the opposite horizontal vibration shakers 21a and 21b are positioned on the same horizontal vibration axis 63 even if the rotational mode M is produced, so that the above-mentioned positional difference (offset) does not appear, whereby cannot be made. However, when the moment cancelling is not implemented, all the vibration ability in the horizontal vibration shakers 21a and 21b can be used as a vibration force for the horizontal vibration axis 63. A waveform represented by a solid line in FIG. 22 indicates a required vibration force of the horizontal vibration shakers 21a and 21b in the case where the moment cancelling is not used, and the required vibration force corresponds to a resultant force of the horizontal vibration shakers 21a and 21b. On the other hand, a waveform represented by a broken line in FIG. 22 indicates a required vibration force of the horizontal vibration shakers 21a and 21b in the case where the moment cancelling is used, and the required vibration force changes dependent upon a ratio of appearance of the rotational mode M, so that such vibration force required for controlling the vibration table 4 by means of the acceleration sensors 64 to 66 becomes a complicated waveform dependent on complexity of the rotational mode M. The vibration force in this case corresponds to a resultant force of the horizontal vibration shakers 21a and 21b.

According to the present invention, the vibration-testing system is characterized by comprising the vibration table on which the material to be tested is placed to implement the vibration test; horizontal vibration shakers disposed on both sides of the vibration table in opposite to each other and for vibrating the vibration table; the means for moving vertically at least either of the horizontal vibration shakers; the sensor for detecting the rotational mode appeared in the vibration table; and the control means for moving vertically the horizontal vibration shakers by the means based on the detection signal of the rotational mode derived from the sensor, whereby the positional difference is produced on the horizontal vibration axes in the opposed horizontal vibration shakers, and in addition, vibration forces of the horizontal vibration shakers are controlled to suppress the rotational mode.

According to the vibration-testing system, when the rotational mode appears, the positional difference (offset) is produced by the control means based on the output from the sensor with respect to the horizontal vibration axis in either of the horizontal vibration shakers, and further vibration forces of both the horizontal vibration shakers are controlled, whereby the rotational mode can be suppressed, resulting in realization of the correct vibration test.

In the vibration-testing system according to the embodiment, it is characterized in that the horizontal vibration shaker is composed of horizontal vibration shakers in the X-direction and horizontal vibration shakers in the Y-direction, and the positional difference is produced on the horizontal vibration axis of either of the horizontal vibration shakers opposed to suppress the rotational mode.

According to the vibration-testing system of the embodiment, in the case where vibration is made in the X- and the Y-directions, so that the rotational mode appears, the positional difference (offset) is produced with respect to the horizontal vibration axis in either of the horizontal vibration shakers in the X- and the Y-directions, and further vibration forces in both the horizontal vibration shakers are made to be variable, whereby the rotational mode can be suppressed, resulting in realization of the correct vibration test.

The vibration-testing system according to the embodiment is characterized by further comprising the moment cancel switch for switching whether or not control of the suppression is made.

According to the vibration-testing system of the embodiment, in the case where moment cancelling is not used through the operation of the moment cancel switch, the rotational mode is not suppressed, so that all the vibration ability in the horizontal vibration shakers can be used as the vibration force of the horizontal vibration axis, and hence, it is user friendly.

In the vibration-testing system according to the embodiment in FIG. 17, it is characterized in that the sensor for detecting the rotational mode is composed of sensors for detecting the accelerated velocity in the Z-direction disposed on four corners of the top of the vibration table, the sensor for detecting the accelerated velocity in the X-direction, and the sensor for detecting the accelerated velocity in the Y-direction, respectively, disposed on sides of the vibration table.

According to the vibration-testing system of the embodiment in FIG. 17, since the sensors for detecting the accelerated velocity in the Z-direction are disposed at four corners on the top of the vibration table, acceleration response in the Z-direction due to appearance of the rotational mode can be correctly detected.

In the vibration-testing system according to the embodiment in FIG. 18, it is characterized in that the sensor for detecting the rotational mode is composed of the sensor for detecting the accelerated velocity in the Z-direction disposed on the top in the substantially central part of the vibration table, a pair of the sensors for detecting the accelerated velocity in the X-direction provided so as to have the difference in the top-to-bottom height direction of the vibration table, and a pair of the sensors for detecting the accelerated velocity in the Y-direction provided so as to have the difference in the top-to-bottom height direction of the vibration table.

According to the vibration-testing system of the embodiment in FIG. 18, the number of the sensors to be used may be reduced further as compared with that of the case of the embodiment in FIG. 17, so that the increase in cost can be suppressed.

What is claimed is:

1. A vibration-testing system, comprising:
   a vibration table (4) on which a material to be tested is placed to implement a vibration test;
   horizontal vibration shakers disposed on both sides of the vibration table (4) in opposite to each other and for vibrating the vibration table (4);
   a means (70a) for moving vertically at least one of the horizontal vibration shakers;
   a sensor for detecting a rotational mode (M) appearing in the vibration table (4); and
   a control means (55) for moving vertically the at least one horizontal vibration shaker by the vertical moving means (70a) based on a detection signal of the rotational mode (M) derived from the sensor, whereby a positional difference is produced on a horizontal vibration axis (63) in the opposed horizontal vibration shakers, and in addition, vibration forces of the horizontal vibration shakers are controlled to suppress the rotational mode (M).

2. The vibration-testing system as claimed in claim 1, wherein the horizontal vibration shaker is composed of horizontal vibration shakers (21a), (21b) in X-direction and horizontal vibration shakers (22a), (22b) in Y-direction, and a positional difference is produced on the horizontal vibration axis (63) of either the X-direction or the Y-direction horizontal vibration shakers (21*a*) (22*a*) to suppress the rotational mode (M).

3. The vibration-testing system as claimed in claim 1, comprising further a moment cancel switch (69) for switching whether or not control and suppression of the rotational mode (M) is made.

4. The vibration-testing system as claimed in any one claims 1 to 3, wherein:

the sensor (64) for detecting the rotational mode (M) is composed of sensors for detecting an accelerated velocity in Z-direction disposed on four corners of the top of the the vibration table (4), a sensor (65) for detecting an accelerated velocity in the X-direction disposed on a side of the vibration table (4), and a sensor (66) for detecting an accelerated velocity in the Y-direction disposed on a side adjacent the location of the sensor detecting the acceleration in the X-direction.

5. The vibration-testing system as claimed in any one claims 1 to 3, wherein:

the sensor for detecting the rotational mode (M) is composed of the sensor (64) for detecting an accelerated velocity in the Z-direction disposed on the top in a substantially central part of the vibration table (4), a pair of the sensors (65) for detecting an accelerated velocity in the X-direction provided so as to have a difference in the top-to-bottom height direction of the vibration table (4), and a pair of the sensors (66) for detecting an accelerated velocity in the Y-direction provided so as to have a difference in the top-to-bottom height direction of the vibration table (4), the X-direction sensors being disposed on a side of the table adjacent a side of the table which includes the location of the Y-direction sensors.

* * * * *